No. 710,278.  
Patented Sept. 30, 1902.
T. H. KLINKER, Jr. & R. GABRIELSKY.
ELECTRIC BATTERY.
(Application filed Apr. 5, 1902.)
(No Model.)
FIG. 1.
FIG. 3.
FIG. 4.
FIG. 2.
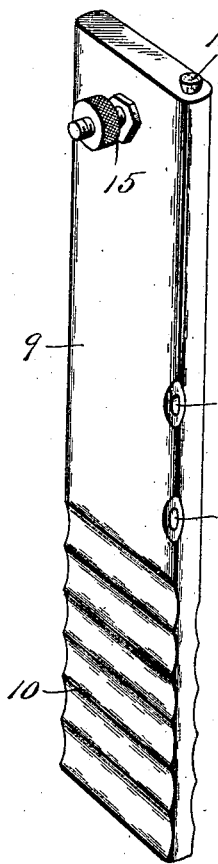
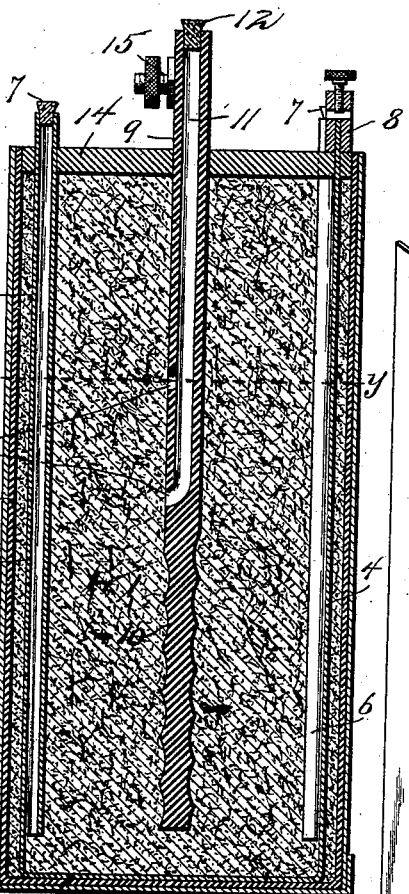
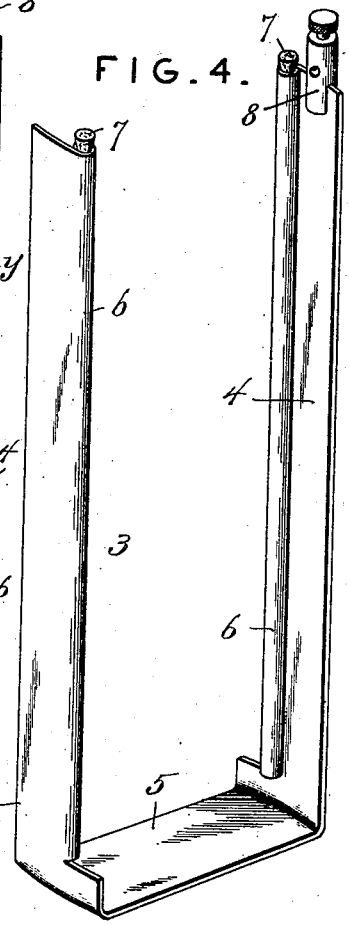
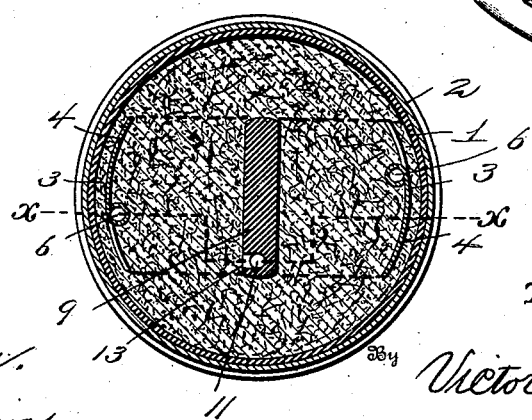
Witnesses  
Harry L. Ames  
Chas. S. Hyer
Inventors  
T. H. Klinker, Jr.  
R. Gabrielsky  
By Victor J. Evans  
Attorney
THE NORRIS PETERS CO., PHOTO-LITHO., WASHINGTON, D. C.

UNITED STATES PATENT OFFICE.

TIMKE HENRY KLINKER, JR., AND RICHARD GABRIELSKY, OF JERSEY CITY, NEW JERSEY.

ELECTRIC BATTERY.

SPECIFICATION forming part of Letters Patent No. 710,278, dated September 30, 1902.

Application filed April 5, 1902. Serial No. 101,605. (No model.)

*To all whom it may concern:*

Be it known that we, TIMKE HENRY KLINKER, Jr., and RICHARD GABRIELSKY, citizens of the United States, residing at Jersey City, in the county of Hudson and State of New Jersey, have invented new and useful Improvements in Electric Batteries, of which the following is a specification.

This invention relates to certain new and useful improvements in electric batteries, and pertains more particularly to what are known as "dry-battery cells."

The primary object of the invention is to provide for a more intimate and tenacious contact between the surface of the negative electrode and the surrounding substance and also to economize in the formation of the zinc electrode, but still preserve the necessary extent of such electrode and the quantity of zinc usually employed by extending the same over a greater surface within the cell and also to have a non-oxidizable inclosure for the cell constructed of sheet-lead in one piece and without a seam.

A further object of the invention is to so construct the positive and negative electrodes that after each effective term of service as a battery has expired the cell containing the same in its apparently-exhausted condition may be revivified and again used as a battery-cell and be equally as efficient as when first constructed.

With these and other objects and advantages in view the invention consists in the construction and arrangement of the several parts, which will be more fully hereinafter described and claimed.

In the drawings, Figure 1 is a vertical sectional view of the improved battery-cell, taken in the plane of the line *x x* of Fig. 2. Fig. 2 is a horizontal section of the improved cell on the line *y y* of Fig. 1. Fig. 3 is a detail perspective view of the negative electrode. Fig. 4 is a detail perspective view of the positive electrode.

Similar numerals of reference are employed to indicate corresponding parts in the several views.

The numeral 1 designates an inclosing casing of sheet-lead formed from one piece of material without a seam, and within this inclosure the electrodes and electrolytic substance are disposed. The lead inclosure 1 is employed in view of its non-oxidizable nature, and when the cell is completed the said inclosure and the parts contained thereby are fitted within an outer paper or other suitable casing 2, as in the ordinary manner of dry-battery-cell arrangement.

The positive electrode 3 is formed from a suitable length of sheet-zinc and constructed in U-shaped contour to provide upwardly-projecting members 4 and a lower supporting or base member 5, the members 4 being long enough to extend above the top of the cell when the base member 5 is disposed on the bottom of the lead inclosure 2, as clearly shown by Fig. 1. Each of the members 4 is transversely cut a short distance above the base member 5 and rolled and secured to form conduits or canals 6, the said conduits or canals on the opposite members 4 being in reverse position. The lower ends of the conduits or canals 6 are permitted to continually remain open, and in the upper ends of the same corks or other suitable stoppers 7 are removably fitted. Secured to the upper end of one of the members 4 is a binding-post 8 for the application of a wire terminal in a manner which will be readily understood.

The negative electrode 9 is of carbon and has the lower extremity 10 formed with transverse grooves to assist in holding the said electrode more firmly in place. The upper portion of the electrode 9 is provided with a chamber 11, which has an upper inlet-opening closed by a removable cork or other stopper 12, the lower portion of the chamber having outlets 13 at different elevations near one end edge.

The electrodes are disposed in the cells as shown by Fig. 1 and held in place by a suitable cap 14, the negative electrode 9 being held suspended in the center of the cell between the opposite members 4 of the positive electrode and also having its upper end projecting far enough above the cap to render the inlet to the chamber 11 conveniently accessible. The upper extremity of the negative electrode 9 is also provided with a binding-post 15 for securing a wire terminal thereto in connecting up the battery or cell. After the electrodes are in place, as set forth, a filling of suitable exciting or electrolytic material, such as sal-ammoniac, which is used alone or in combination with some other well-known material for the purpose, is placed in the cell between the members 4 of the positive electrode and the negative electrode in the center. As in the usual form of dry batteries, this filling is closely packed, and it will be seen from the formation and position of the positive electrode that a large zinc surface is exposed to the attack of the filling, with the same beneficial result and effectiveness in the operation of the battery or cell. Primarily the filling will be moistened, and in the first instance this may be done before the final sealing or application of the cap 14; but provision is made for quickly moistening the filling through the medium of the chamber 11 in the negative electrode and the conduits or canals 6, forming part of the members 4 of the positive electrode. In the use of these conveying auxiliaries the corks or stoppers are removed from the upper inlets thereof and the liquid poured, respectively, into the canals or conduits 6 and the chamber 11, and as the lower terminals of the conduits or canals are close to the bottom of the cell the liquid will be regularly distributed throughout the lower portion of the filling, whereas the two outlets 13 at different elevations will cause the upper part of the filling to become thoroughly moistened. After the battery has effectively served the usual term and expires it may be readily revivified by removing the corks or stoppers 7 and 12 and again introducing liquid through the conduits or canals 6 and the chamber 11 to the filling, and thereby restore the battery, so that it may be used and be equally as efficient as when first constructed.

While the preferred form of the improved cell has been shown and described, it will be understood that various changes may be made in the details of construction without departing from the spirit of the invention.

Having thus fully described the invention, what is claimed as new is—

1. In an electric battery the combination of an inclosure, a positive electrode having upwardly-projecting tubular members rising from a bottom thereof, a chambered negative electrode suspended in the center between the upwardly-projecting members of the positive electrode, and an exciting-filling in contact with the said electrodes.

2. In a battery, the combination of an inclosure, a positive electrode having upwardly-projecting members provided with conduits accessible from the exterior, a negative electrode having a chamber with lower outlets and an upper inlet, and an exciting-filling engaging the said electrodes.

3. In a battery, the combination of an inclosure, a positive electrode disposed therein and having opposite side members projecting above the top of the inclosure and provided with conduits open at the bottom and normally closed at their upper ends, a negative electrode having a chamber therein with an upper inlet and lower outlet at different elevations, the said negative electrode being suspended between the opposite portions of the positive electrode, and an exciting-filling engaging the said electrodes.

In testimony whereof we affix our signatures in presence of two witnesses.

TIMKE HENRY KLINKER, JR.
RICHARD GABRIELSKY.

Witnesses:
RICHARD T. HARMON,
LEWIS ROGERS.